(No Model.) 3 Sheets—Sheet 2.
F. KLEEMANN.
FILTER PRESS.
No. 407,221. Patented July 16, 1889.
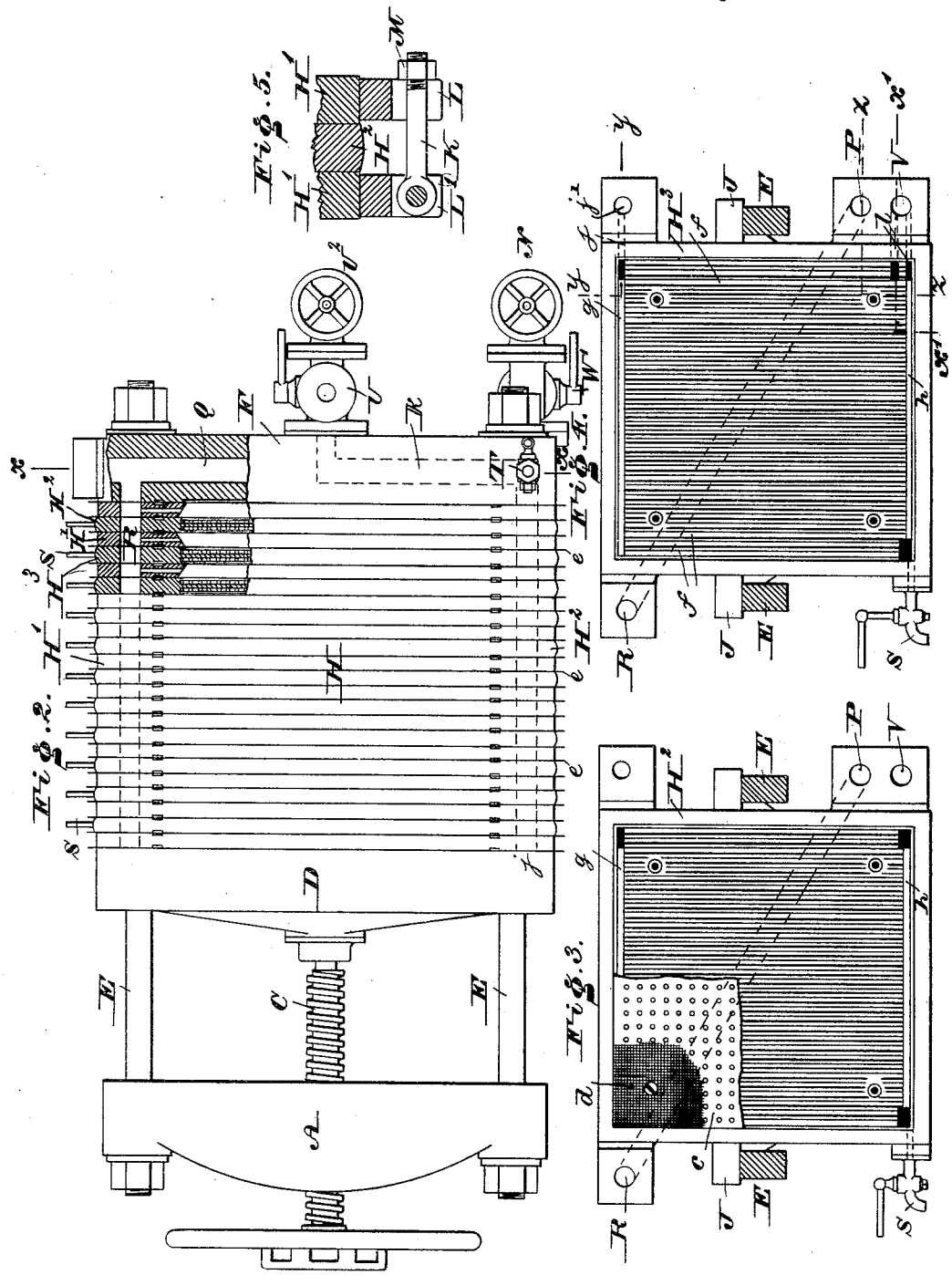

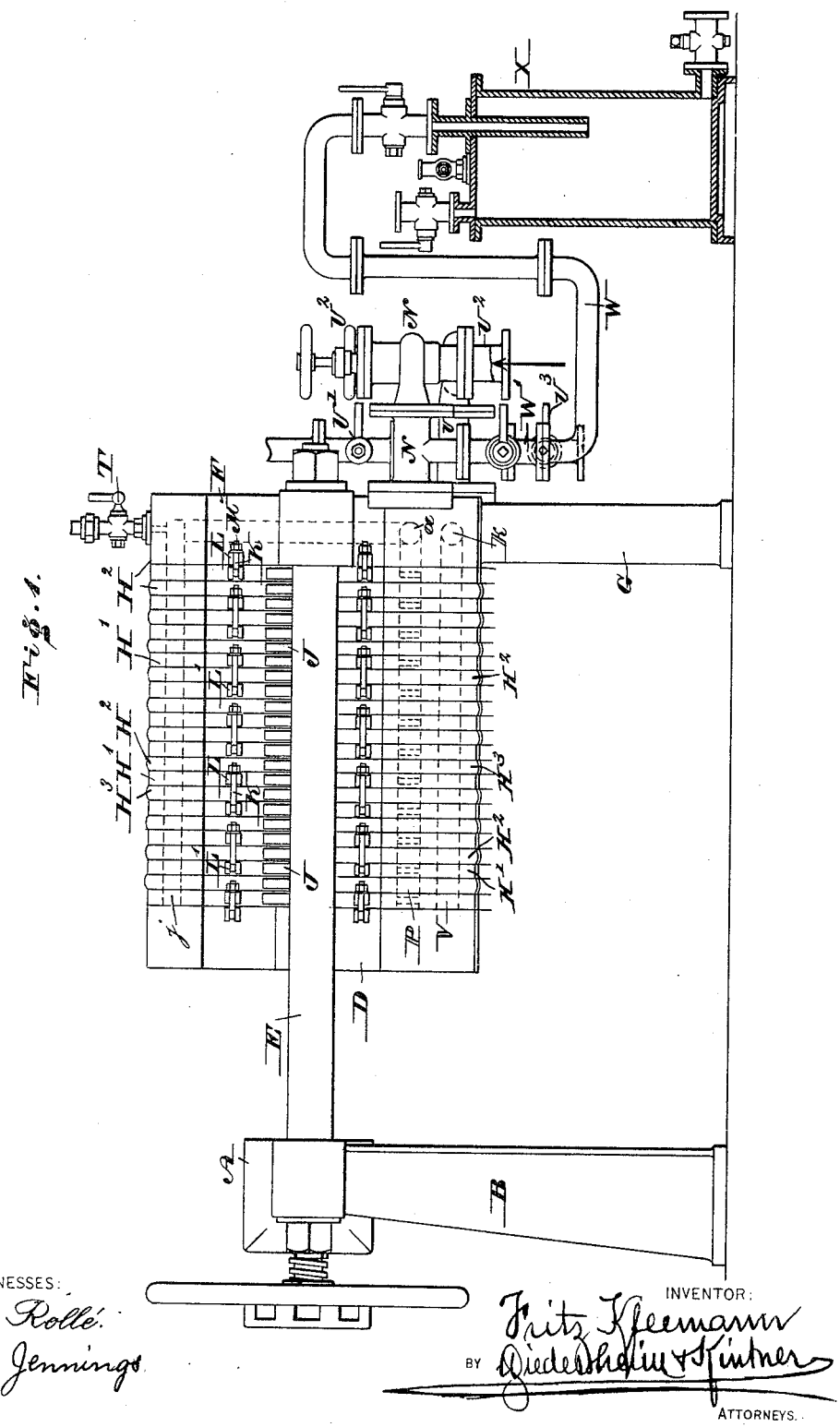

(No Model.)  3 Sheets—Sheet 3.
F. KLEEMANN.
FILTER PRESS.
No. 407,221. Patented July 16, 1889.
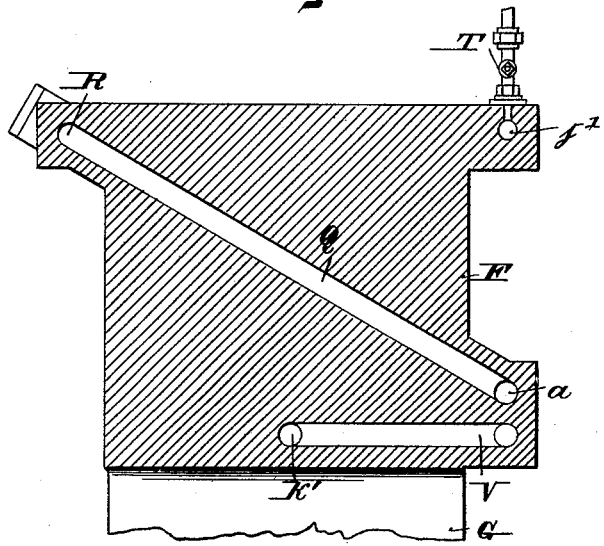
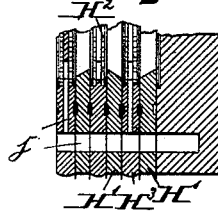
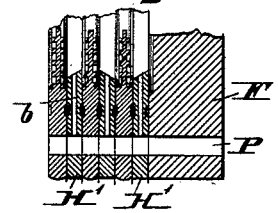
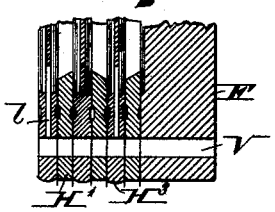
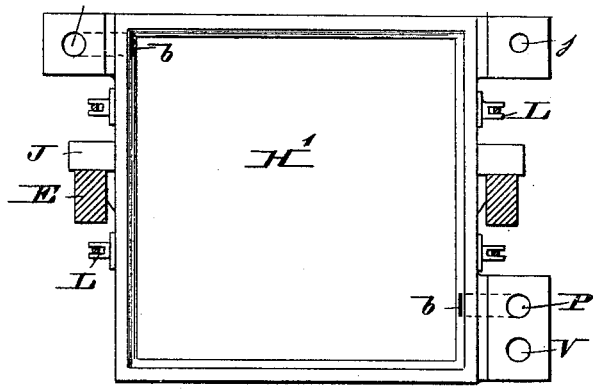
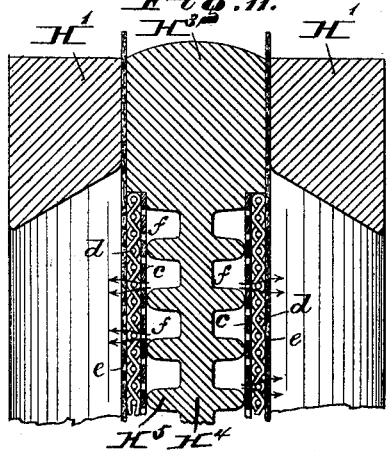
WITNESSES:
Theo. Rollé.
A. P. Jennings.
INVENTOR:
Fritz Kleemann
BY Diedersheim & Krintner
ATTORNEYS.

UNITED STATES PATENT OFFICE.

FRITZ KLEEMANN, OF SCHÖNINGEN, BRUNSWICK, GERMANY.

FILTER-PRESS.

SPECIFICATION forming part of Letters Patent No. 407,221, dated July 16, 1889.

Application filed July 11, 1888. Serial No. 279,623. (No model.)

*To all whom it may concern:*

Be it known that I, FRITZ KLEEMANN, a subject of the Emperor of Germany, residing at Schöningen, Brunswick, Germany, have invented a new and useful Improvement in Filter-Presses, which improvement is fully set forth in the following specification and the accompanying drawings.

My invention consists of improvements in filter-presses, whereby the following are secured: The formation of absolute homogeneous press-cakes, the filtration of the liquid previously separated from the press-cakes or of another fluid through the same, the entire recovery of the liquid remaining in the press-cakes by displacement of the smallest quantity of water or of another suitable fluid, and any loss of material to be filtered is avoided.

Figure 1 represents a side elevation of a filter-press embodying my invention. Fig. 2 represents a partial top or plan view and partial horizontal section thereof. Figs. 3 and 4 represent face views of the filter-plates. Fig. 5 represents a sectional view of the connecting devices of the plates and frames. Fig. 6 represents a section of the head of the press on line $x\ x$, Fig. 2. Figs. 7, 8, and 9 represent sections on lines $y\ y$, $z\ z$, and $x'\ x'$, respectively, Fig. 4. Fig. 10 represents a face view of one of the cake-frames. Fig. 11 represents a horizontal section of the filter-plates and adjacent cake-frames on an enlarged scale.

Similar letters of reference indicate corresponding parts in the several figures.

Referring to the drawings, A represents a cross-head, which is supported on standards B, and has fitted to it a screw C, which latter is swiveled to the plate, head, or follower D of the press.

E represents rods or beams, which are connected at one end with the cross-head A and at the other end with the head F, the latter being supported on standards G, the rods or beams having threaded ends for engagement of the clamping-nuts.

H represents a series of filter plates and frames, which are provided with projections or blocks J on the sides thereof, said plates and frames being fitted between the beams E and supported thereon by means of the projections J, said beams and connected parts forming a stand to support the frames and plates H, and the plate, head, or follower D.

The frames and plates H consist of the cake-frames H' and filter-plates $H^2\ H^3$, said cake-frames being internally of the form of a frustum of a cone. The plates $H^2\ H^3$ have their opposite sides covered by plates $c$ of perforated metal, wire or other strong gauze $d$, and filtering-cloths $e$, said plates and gauze being screwed or otherwise secured to the filter-plates $H^2\ H^3$, the cloths $e$ being on the outside and the gauze, as is evident, between the plates $c$ and the cloths $e$, thus causing an effective distribution of fluid behind the cloths, and thus causing a homogeneous cake during the filtration, and on the other hand causing an equal penetration of the fluid through the formed cakes during the filtration through the cakes and during the recovery of the liquid from the cakes by displacement. Between the plates $c$, and secured to the borders of the plates $H^2\ H^3$, is a neck $H^4$, having secured to or formed with it ribs or heads $H^5$ at intervals, producing vertical grooves or passages $f$, (see Fig. 11,) which are open at top and bottom and communicate with recesses $g\ h$ at the top and bottom of the frames H'. (See Figs. 3 and 4.) In the top of the plates $H^3$ are ports $j$ and channels $j'$, which communicate with the recesses and with a cock or valve T, for discharging the air in the plate when so required. In the lower portion of the plates $H^3$ are ports $l$, which communicate with the recesses $h$ and the hole V for inlet of the liquid to be filtered through the cakes, or of the liquid for displacement purposes.

The head, plate, or follower D and the head F are provided on the inside with the features of the plate $H^2$, and are fitted with cocks S in the same way as the plates $H^2\ H^3$.

The disposal of the plates and frames H within the press is such that the head F represents half a plate $H^2$; then follow successively one frame H', one plate $H^3$, one frame H', one plate $H^2$, and so on, throughout the series, so that at first the frames H' and the plates $H^2$ and $H^3$ alternate, and, secondly, the plates $H^2$ and $H^3$ alternate as filter-plates. (See Figs. 1 and 2.)

It will be seen that the conical form of the frames H', arranged as is shown in Figs. 1 and 2, serves to present the largest surface to the plate H³

In order to couple two frames H' and one plate H², I provide bolts K and bifurcated lugs L, which are secured to alternate frames H', so that the bolt of one frame enters the lug of the other frame and is tightened thereagainst by a nut M. When the nuts are unscrewed, the bolts may be disengaged and the frames separated. To the head F is connected the supply-pipe N at the inlet-opening a, from which branch the passages P Q, the passage P being formed longitudinally in the lower portion of the several plates and frames H, and closed by the follower D. The passage Q extends to the top of the head F and communicates with a passage R, which latter is formed in the upper portion of the several plates and frames H and closed by the follower D. The inlet a has connected with it a pipe W, (see Fig. 1,) which pipe is in communication with the supply-pipe N and has a cock or valve W' for opening and closing purposes. The pipe W leads to an air-chamber X, from which the air may be exhausted by any suitable means, so as to create a vacuum for discharging the contents of the channels or passages P Q R.

Connected with the head F is a pipe U, which communicates with the passage K' in said head for directing water or other fluid into the plates H³. The passage K' communicates with a passage V, (shown in Fig. 6 and in dotted lines, Fig. 1,) said passage extending longitudinally through the plates and frames and communicating with the filter-plates H³ by means of the passages l in the borders of said plates. (See Figs. 4 and 9.)

The pipe U has connected with it the valves or cocks U', U², and U³, the valves being used for directing the fluid for displacement purposes, valve U² for directing the liquid to be filtered through the cakes into the passage K, and valve U³ for discharging the fluid remaining within the plates H³ and the channels V and K.

The operation is as follows: The proper cocks or valves are opened and closed as necessary and the material to be filtered or separated from the solid substances therein contained forced through the supply-pipe N into the filter-press, the same being distributed through the passages P R, and from thence entering the cake-frames H' by the passages b, where it is equally distributed, having entered said frames in opposite directions. The pressed fluid passes through the filtering-coverings of the plates H² H³, and is thereby filtered, the cake refuse or solid matter remaining in the frames H'. The filtered fluid then flows through the passages f to the recesses h, where it may be drawn off by the cocks S. When the discharge of filtered fluid ceases, then the cakes are formed and capable of being used as a proper filter material. For this purpose, after the supply-pipe N and the cocks S of the plates H³ are closed, the cock or valve U² is opened, so that the liquid to be filtered through the cakes now is forced through the passages K, V, and l into the recesses h and passages f of the plates H³, from where it is by means of the gauze d equally distributed and able to penetrate the cakes in the direction of the arrows in Fig. 11, pressing the cakes in the conical form of the frames H', and thus keeping the same homogeneous. The fluid then enters the plates H² and is discharged by their cocks S. After the filtration has been accomplished the valve U² is closed, and all the contents of the passages K V and of the plates H³ may flow out by the cock U³ to be used for the next filtration.

In order to recover the liquid or fluid remaining in the solid substance in the cake-frame, the valve or cock U³ is now closed and the cock U' opened. The water or other suitable liquid employed now flows through the passages K, V, and l, into the recesses h and passages f of the plates H³, and penetrates the cakes in the same direction, as shown by the arrows in Fig. 11, displacing the liquid which is retained in the cakes. The displaced fluid enters the plates H² and flows out through the cocks S of said plates. After the displacement has been finished the cock U' is closed and the cock U³ and the air-cock T are opened. The displacement-liquid which remains in the channels and passages K, V, and f of the plates H³ flows out through the cock U³.

As the material primarily enters the filter-press, the air contained in the latter enters the recesses h and reaches the cocks S; but during the subsequent filtration through the cakes and the recovery by displacement the cock or valve T is employed to discharge and to admit the air, said cock or valve being closed when the fluid appears or approaches the same.

After the work has been accomplished whatever material remains in the channels P Q R may be removed by opening the cock W' and withdrawn by the action of the vacuum-chamber X.

By properly rotating the screw C the follower D is released, whereby the frames may be separated and the cakes easily removed from the frames H', whereby the filter-press is ready for another operation.

Having thus described my invention, what I claim as new, and desire to secure by Letters Patent, is—

1. In a filter-press, standards with a cross-head and side rods, the follower D, the cross-head F, with the diagonal passage Q, the filter-plates H² H³, and cake-frames H', said plates and frames being between said follower and cross-head F and having the longitudinal passages P and R, communicating with said passage Q, and the said cake-frames H', having the passages b, leading from said passages P and R, and the supply-pipe N, leading into said passage Q, said parts being combined substantially as described.

2. In a filter-press, standards with side rods and cross-head, a follower guided on said side rods, the head F, with passage Q and inlet $a$, the filter-plates $H^2$ $H^3$, and cake-frames $H'$, said plates and frames being between the follower and head F and having the longitudinal passages P and R communicating with the passage Q, and the said plates $H^2$ $H^3$, having the lower recesses $h$, and the ports $j$ and channels $j'$, communicating with said recesses $h$, and the said cake-frames $H'$, having the passages $b$, communicating with the passages P and R, and the supply-pipe N, leading into the passage Q, said parts being combined substantially as described.

3. In a filter-press, the combination of a follower, with the cake-frames $H'$ and filter-plates $H^2$ $H^3$, the said frames and plates having longitudinal passages P and R and openings V, and said frames $H'$, having the passages $b$, leading from said passages P and R, and the plates $H^2$ $H^3$, having the recesses $h$ and communicating ports $l$, filtering plates and cloths between said frames $H'$ and plates $H^2$ $H^3$, the head F, with passage Q, communicating with passages P and R, and the supply-pipe N, substantially as described.

4. The combination of standards with side rods and a cross-head, a follower guided on said side rods, the cross-head F, with passage Q, cake-frames $H'$, and filter-frames $H^2$ $H^3$, having passages P and R, the cake-frames having the passages $b$, communicating with said passages P and R, and the plates having recesses $h$ and $g$, vertical grooves connecting said recesses and ports $l$, filtering plates and cloths between said cake-frames and filter-plates, and supply-pipe N, leading to said passage Q, substantially as and for the purpose set forth.

5. In a filter-press, the combination of two cake-frames $H'$, having bifurcated lugs L, with a filter-plate between the said frames, the bolt K, and nut M, substantially as described.

6. In a filter-press, the filter cake-frames $H'$, having their inner faces inclined, the filter-plates $H^2$ $H^3$, with ports and recesses, substantially as described, the neck $H^4$, having ribs forming vertical passages communicating with the ports and recesses of said plates, the said plates being secured to said frames so that a plate is between adjacent frames and the plates $H^2$ $H^3$ alternate with each other, and each plate having its outer side covered with a perforated sheet or netting, said parts being combined substantially as and for the purpose set forth.

7. In a filter-press, the combination of a follower with the cake-frames $H'$ and filter-plates $H^2$ $H^3$, the said plates having the longitudinal passages P and R and openings V, the plates $H^3$, having the recesses $h$ and communicating passage $l$, filtering material between each of said cake-frames and each of said filter-plates, the head F, with passage Q and passage $K'$, the pipe N, communicating with the said passage Q, and the pipe U, communicating with the passage $K'$ and having the valve $U'$ and cock S, substantially as and for the purpose set forth.

FRITZ KLEEMANN.

Witnesses:
A. P. JENNINGS,
JOHN A. WIEDERSHEIM.